United States Patent [19]

Weertman

[11] Patent Number: 4,703,725
[45] Date of Patent: Nov. 3, 1987

[54] MOUNTING OF AN ENGINE BALANCING DEVICE

[75] Inventor: Willem L. Weertman, Franklin, Mich.

[73] Assignee: Chrysler Motors Corporation, Highland Park, Mich.

[21] Appl. No.: 868,905

[22] Filed: May 29, 1986

[51] Int. Cl.$^4$ .............................................. F02B 75/06
[52] U.S. Cl. ............................ 123/192 B; 123/195 H
[58] Field of Search ....... 123/196 R, 198 DA, 198 E, 123/195 H, 192 R, 192 B; 74/603, 604, 605, 467, 573 R; 184/6, 6.5, 11.4

[56] References Cited

U.S. PATENT DOCUMENTS

| | | |
|---|---|---|
| 1,163,832 | 12/1915 | Lanchester . |
| 1,164,367 | 12/1915 | Lanchester . |
| 1,517,587 | 12/1924 | Roth . |
| 1,588,720 | 6/1926 | Gilbert . |
| 1,658,979 | 2/1928 | Fisher . |
| 1,898,459 | 2/1933 | Newcomb . |
| 2,010,056 | 8/1935 | Brush . |
| 2,062,583 | 12/1936 | Kruczek ................................. 180/1 |
| 2,179,709 | 11/1939 | Brecht ................................. 123/195 |
| 2,182,988 | 12/1939 | Iseler ..................................... 74/604 |
| 2,183,467 | 12/1939 | Sarazin .................................. 74/604 |
| 2,214,921 | 9/1940 | Criswell ................................. 74/574 |
| 2,284,515 | 5/1942 | Criswell ................................. 74/604 |
| 2,519,208 | 8/1950 | Weinberg . |
| 2,566,476 | 9/1951 | Zuhn ..................................... 74/604 |
| 2,619,943 | 12/1952 | Monleone . |
| 2,632,340 | 3/1953 | Dolza et al. .......................... 74/603 |
| 2,688,839 | 9/1954 | Daub . |
| 2,807,249 | 9/1957 | Peras .................................... 123/56 |
| 2,838,957 | 6/1958 | Johnson ................................ 74/604 |
| 2,914,137 | 11/1959 | Sykes ..................................... 184/6 |
| 2,914,963 | 12/1959 | Scherenberg ......................... 74/604 |
| 2,914,964 | 12/1959 | Bensinger et al. .................... 74/604 |
| 3,109,417 | 11/1963 | Bekkala et al. ....................... 123/90 |
| 3,110,195 | 11/1963 | Hanley ................................. 74/604 |
| 3,145,695 | 8/1964 | Conover et al. .................... 123/41.74 |
| 3,308,680 | 3/1967 | Sherrick ............................... 74/603 |
| 3,418,993 | 12/1968 | Scheiterlein et al. ............... 123/195 |
| 3,473,399 | 10/1969 | Buchwald . |
| 3,511,110 | 5/1970 | Grieve .................................. 74/604 |
| 3,613,645 | 10/1971 | Froumajou et al. ............. 123/41.46 |
| 3,626,786 | 12/1971 | Kinoshita et al. ................... 74/604 |
| 3,673,651 | 7/1972 | Stewart .................................... 29/6 |
| 3,678,914 | 7/1972 | Vulliamy ........................... 123/195 C |
| 3,710,774 | 1/1973 | Weseloh et al. ................. 123/192 B |
| 3,763,716 | 10/1973 | Blomberg ............................ 74/604 |
| 3,800,625 | 4/1974 | Seino et al. ........................... 74/604 |
| 3,830,212 | 8/1974 | Seino et al. ..................... 123/192 B |
| 3,962,932 | 6/1976 | Okamoto et al. ..................... 74/604 |
| 3,995,610 | 12/1976 | Nakamura et al. ............. 123/192 B |
| 4,000,666 | 1/1977 | Ito et al. ................................ 74/604 |
| 4,028,963 | 6/1977 | Nakamura et al. ................... 74/604 |
| 4,031,761 | 6/1977 | Fisher et al. ....................... 74/15.63 |
| 4,074,589 | 2/1978 | Nakamura et al. ................... 74/604 |
| 4,095,579 | 6/1978 | Iwasa et al. ......................... 123/192 |
| 4,125,036 | 11/1978 | Nakamura et al. ................... 74/604 |
| 4,300,493 | 11/1981 | Berti ................................ 123/192 B |
| 4,440,123 | 4/1984 | Tsai ................................. 123/192 B |
| 4,480,607 | 11/1984 | Tsai ................................. 123/192 B |
| 4,508,069 | 4/1985 | Dobler et al. ................... 123/192 B |
| 4,510,898 | 4/1985 | Ampferer ........................... 123/192 |

FOREIGN PATENT DOCUMENTS

| | | |
|---|---|---|
| 3109109 | 9/1982 | Fed. Rep. of Germany ....... 184/6.5 |
| 674225 | 9/1949 | United Kingdom . |

Primary Examiner—Craig R. Feinberg
Assistant Examiner—David A. Okonsky
Attorney, Agent, or Firm—Kenneth H. MacLean, Jr.

[57] ABSTRACT

An engine balance device utilizing rotating balance shafts mounted in a housing means beneath the crankshaft and attached to the engine block by a plurality of legs spaced in the direction of the crankshaft axis to engage bearing journals located between cylinder bores. An oil pumping means evacuates oil from the housing means in cooperation with vacuum formation preventing air bleed means to the housing interior.

1 Claim, 5 Drawing Figures

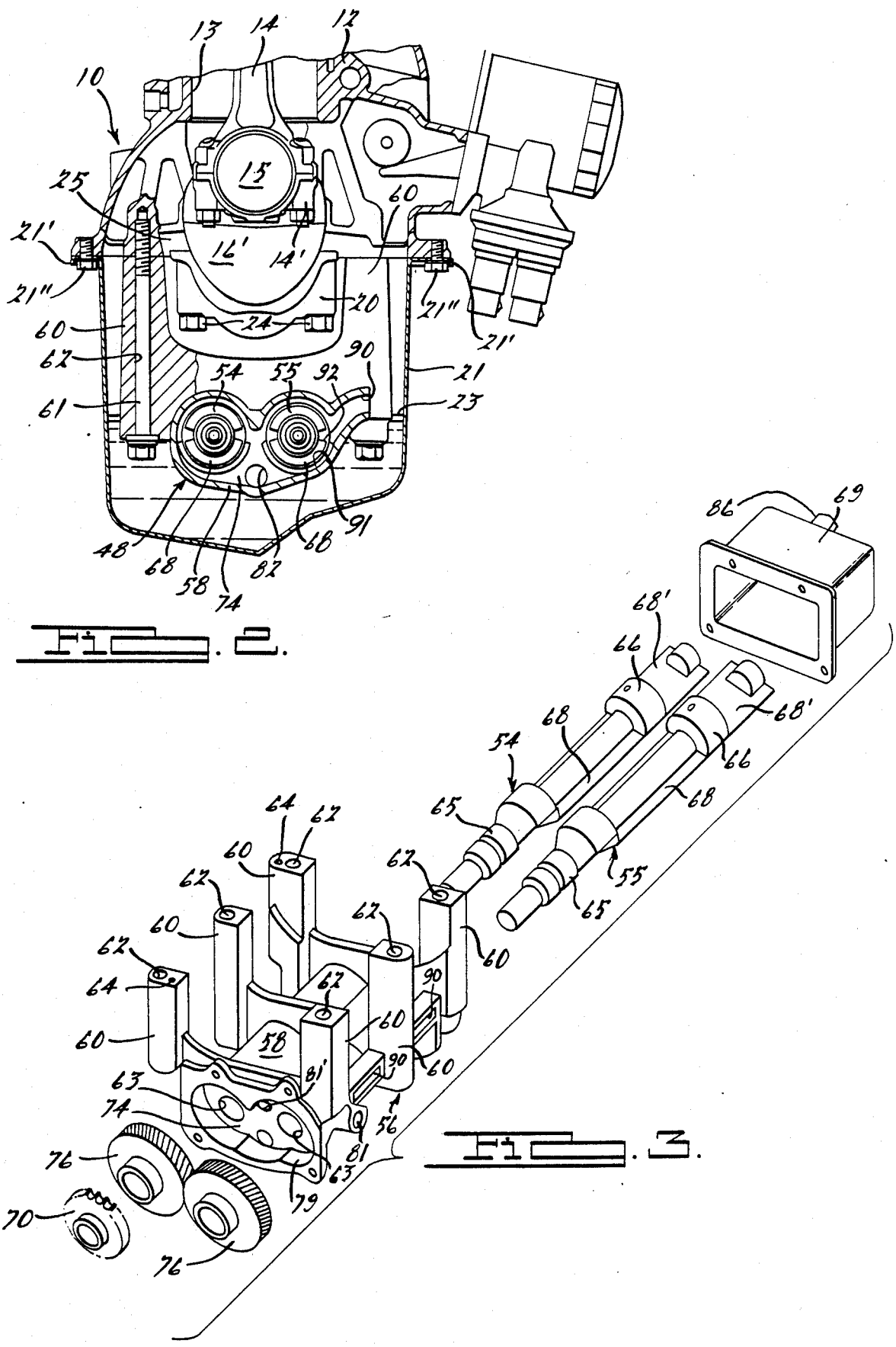

MOUNTING OF AN ENGINE BALANCING DEVICE

BACKGROUND OF THE INVENTION

1. Field Of The Invention

This application relates to an improved balancing mechanism for adaptation to an internal combustion engine. More particularly, the invention utilizes two oppositely rotating counter balance shafts mounted within a housing which is hang mounted beneath the engine crankshaft and partially submerged in engine lubricating oil. The housing has a plurality of mounting columns which engage the partitions of the engine block which also serve as the bearing support for the crankshaft.

2. Prior Art

There are many different designs and balancing mechanisms for internal combustion engines. Representative patents showing different configurations are described hereinafter.

Some engine balancing mechanisms were patented many years ago and are disclosed hereinafter. U.S. Pat. No. 1,164,267 to Lanchester utilizes two shafts mounted laterally with respect to the axis of the crankshaft and supported by a similarly extending bracket which engages the shaft ends. Unbalanced rotors are supported about the shafts. The U.S. Pat. No. 1,588,720 to Gilbert discloses a balancing mechanism with a piston which is vertically reciprocal in an opposite direction to the usual engine piston. The U.S. Pat. No. 1,658,979 to Fisher is similar to the Lanchester patent by its use of laterally extending shafts mounted by end portions in a laterally extending housing. The U.S. Pat. No. 1,898,459 to Newcomb discloses a balance mechanism with a pair of shafts which extend parallel to the engine crankshaft. The shafts are rotatably mounted between a lower portion of the engine block and an oil pan and are driven by a laterally extending cross-shaft engaging a gear on the crankshaft. The British Patent No. 674,225 discloses a balancing mechanism somewhat like as shown in the Newcomb patent, but utilizes a frame-type housing to mount lobed balance shafts for rotation. The unbalanced or lobe portions of the shafts are located on both sides of several bearing portions or journals as are provided in laterally extending partitions of the frame.

There are a number of patents which disclose balance shafts which are supported in bearing journals formed in the engine block itself. U.S. Pat. No. 3,308,680 to Sherrick discloses an engine having a balance shaft mounted in the block to one side of the crankshaft. There are unweighted portions supported on the shaft end, and also along the shaft on either side of several bearings for the shaft. Also, U.S. Pat. No. 4,028,963 to Nakamura discloses an engine block with balance shafts mounted for rotation in the engine block above the crankshaft axis. Similar configurations are disclosed in U.S. Pat. Nos. 4,508,069 to Dobler and 4,510,898 to Ampferer.

There are also a number of patents disclosing balance shafts mounted in housings which are, in turn, supported below the engine crankshaft. Two recent U.S. Pat. Nos. 4,440,123 and 4,480,607 utilize an Oldham coupling device to provide engine balancing instead of more conventional balance shafts. U.S. Pat. Nos. 2,914,963 and 2,914,964 disclose balance shafts with rotatable weight portions rotated thereabout and the shafts are mounted in a housing which is hung from a portion of one of the main bearing journals for the crankshaft. U.S. Pat. Nos. 2,688,839 to Daub; 2,914,137 to Sykes; and 4,300,493 to Berti disclose balancing mechanisms in housings which are located beneath the crankshaft.

SUMMARY OF THE INVENTION

The subject invention relates to an engine balancing mechanism of the type utilizing elongated shafts with shaft axes extending in the longitudinal direction parallel to the crankshaft. The shafts are rotatably supported in a lightweight but rigid housing secured to several crankshaft bearing portions of the block for imparting integrity and rigidity to the lightweight housing. Specifically, the housing includes a hollow body portion which encloses the balance shafts. At least two, but preferably three, relatively narrow mounting legs or columns extend upward from both sides of the body portion into contact with the engine block. Specifically, the columns bear against traversely extending crankshaft bearing partitions of the block which otherwise support the crankshaft. Elongated bolt fasteners extend through the mounting legs or columns to secure the housing up against the bearing partitions of the block. This situates the housing downward from the crankshaft and provides clearance therebetween for movement of conventional crankshaft weight portions and the connecting rod journals including bearing cap portions movable with the throws of the crankshaft.

The housing body of the balancing mechanism has apertures through both ends which form journals for the rotating balance shafts. At one end of the housing, an end portion of each balance shaft extends through an aperture and out from the interior of the housing. A cup or hat-shaped enclosure surrounds these shaft end portions thus isolating them from the engine crankcase and, specifically, the lubricating oil therein. Oil drain or discharge means in the form of a channel in the housing evacuates oil from the interior of the body of the housing and also from the interior of the cup-shaped enclosure. Vent means through the upper portion of the enclosure admits air to the interior of the enclosure to prevent formation of subatmospheric pressure condition within the enclosure which would hinder or prevent evacuation of oil therefrom.

DESCRIPTION OF THE DRAWINGS

FIG. 2 is a cross sectional end view of the engine shown in FIG. 1 with the balancing mechanism taken along section line 2—2 in FIG. 1 and looking in the direction of the arrow;

FIG. 3 is an exploded perspective view of the balancing mechanism and housing;

DESCRIPTION OF THE PREFERRED EMBODIMENT

Figure 1:
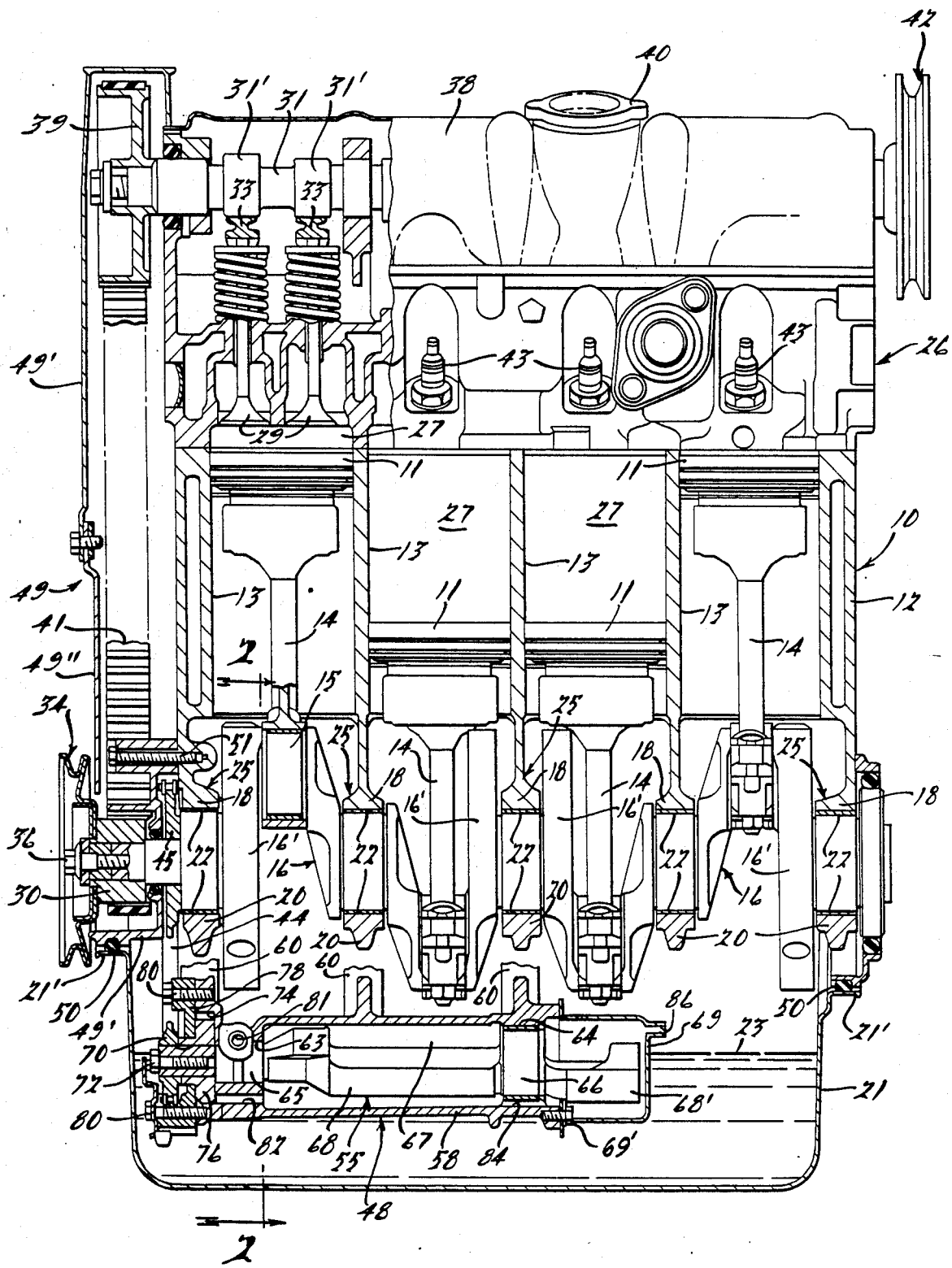
FIG. 1 is a side and partially cross sectional view of a four-cylinder engine, including the subject balancing mechanism and housing.
Figure 4:
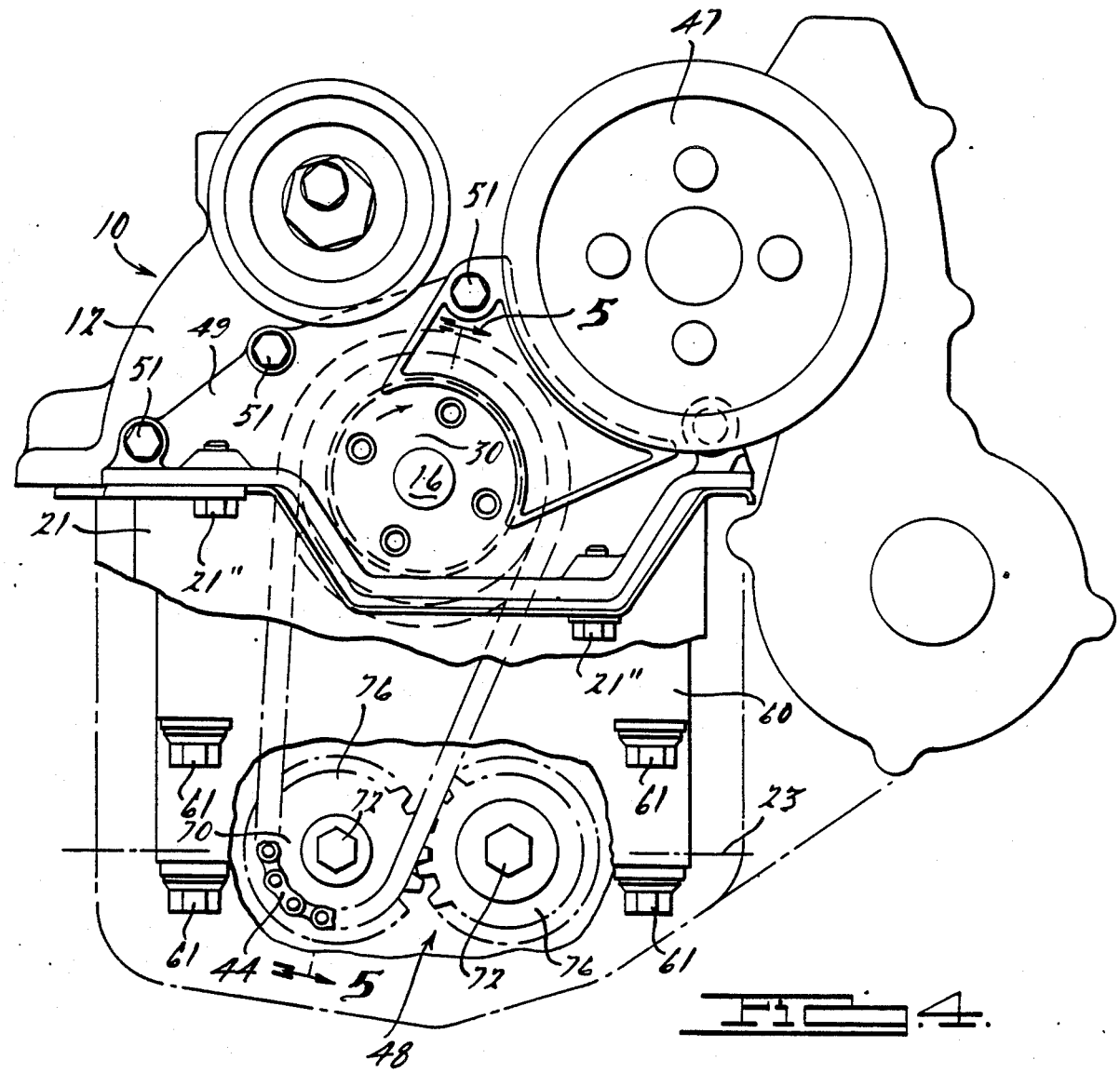
FIG. 4 is a partial front end view of the engine partially broken away to show portions of the balancing mechanism.

In FIGS. 1, 2 and 4, an engine 10 is illustrated which is a four-cylinder internal combustion engine commonly used in domestic automobiles and, particularly, in engines which are front-wheel driven. The engine has a plurality of pistons 11 which are reciprocally mounted with cylinder bores 13 of the cylinder block 12. The pistons 11 are connected by connecting rods 14 to the crankshaft 16 of the engine and, specifically, to journal portions 15 of the crankshaft by bolt fasteners extending through connecting rod lower bearing portions 14 as is conventional in construction of internal combustion engines. The pistons 11 reciprocate between bottom and top dead center positions in the cylinders as the crankshaft 16 rotates in the cylinder block 12. In FIG. 1, the right and the left end portions are shown at the top dead center position, while the two middle pistons are at bottom dead center positions. After the crankshaft 16 is rotated 180 degrees, the two middle pistons would be in the top dead center positions and the two end pistons would be in the bottom dead center positions. As is well known in the in-line four cylinder engine art, vertical shaking forces are present that have a frequency of two times engine RPM. The magnitude of these secondary forces is determined by the reciprocating weight of the piston, piston pin, piston rings and small end of the connecting rod; the length of the connecting rod and the radius of the crankshaft throw. These secondary forces are caused by the additional acceleration and deceleration of the pistons due to the outward movement of the large end of the connecting rods as they rotate between top dead center and bottom dead center positions. The subject balancing mechanism is for the purpose of counteracting these unbalanced vertical shaking forces as described further hereinafter. Also shown in FIG. 1 and FIG. 2 are counterbalance weight portions 16' of the crankshaft 16 and on either side of the journal portions 15.

Figure 5:
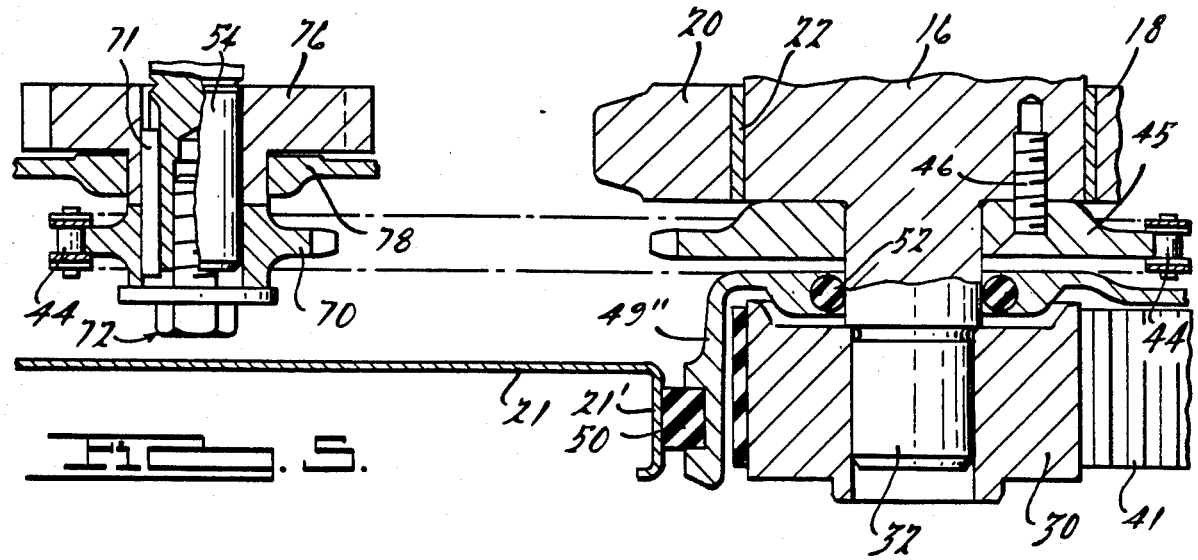
FIG. 5 is an enlarged section view taken along section line 5—5 in FIG. 4 and looking in the direction of the arrow.

The crankshaft 16 is supported at either end in bearings 18 of the cylinder block 12 as best shown in FIG. 1 and FIG. 5. The crankshaft is secured to the bearing portions 18 by bearing caps 20. Specifically, the crankshaft 16 rotates within an annular bearing shell 22 as is conventional in internal combustion engines. The crankshaft 16 and the bearing shell 22 are secured to the bearing portion 18 of the block 12 by the bearing cap 20 best shown in FIG. 2. Bolt fasteners 24 secure the caps 20 to a transversely extending web or bearing partition 25 of the cylinder block 12 as best shown in FIG. 1 and FIG. 2. The bearing web portions 25 extend between the cylinders and in cooperation with portions 18 at the ends of the block and thereby the crankshaft is rigidly supported for rotation. Note that the web portions 25 extend in a lateral or transverse direction as opposed to the longitudinal direction of the axis of the crankshaft 16.

The movement of pistons 11 in the cylinders 13, the rotation of the crankshaft 16 in the bearings 22 and the rotation of connecting rods 14 about the journal portions 15 are a considerable potential for friction and wear. As is well known, these surfaces are lubricated by oil. A quantity of lubricating oil 23 is normally stored in the engine beneath the crankshaft 16 and within an oil pan member 21. The oil pan 21 has an outwardly extending edge portion 21' which attaches to the cylinder block 12 by cap screw fasteners 21'' in a leak resistant manner.

As is conventional in modern internal combustion engines, the pistons 11 and cylinder bores 13 cooperate with a cylinder head assembly 26 to form combustion chambers 27. Fuel and air is admitted to the combustion chambers 27 and exhaust products are discharged from the combustion chamber 8 through intake and exhaust ports of the cylinder head 26 which are normally controlled by intake and exhaust valves 29. Although only the one combustion chamber 11 with valves 29 are shown in FIG. 1, each of the other chambers 11 also has an intake and exhaust valve to control flow of fluid through the associated intake and exhaust ports. The opening and closing of valves 29 are controlled by rotatable camshaft 31 which has lobe portions 31' thereon. When rotated, the lobes 31' bear against a valve arm 33 to cause the associated valve to move downward to permit fluid to flow through the corresponding intake or exhaust port. The downward movement of valve 29 is in opposition to valve springs 35, one of which is associated with each intake and exhaust valve. The camshaft 31 rotates at half crankshaft speed within journal portions 37 of the cylinder head assembly 26.

A toothed wheel 39 is attached to the leftward end of the camshaft 31 and is engaged by a flexible toothed belt 41. The toothed belt 41, in turn, engages a second toothed wheel 30 which is attached to the leftward end 32 of the crankshaft 16 in FIG. 1. Specifically, the toothed wheel 30 and a V-belt pulley 34 are attached to the leftward end 32 of the crankshaft 16 by a bolt fastener 36 as best shown in FIG. 1. The camshaft's toothed wheel 39 is exactly twice the effective diameter of the crankshaft's toothed wheel 30. In other words, wheel 39 has twice the number of teeth formed on its circumference in order to be rotated at half the speed of the crankshaft 16.

The camshaft 31 and associated valve mechanism is covered by a thin metal valve cover 38 which has an oil filler opening normally covered by cap 40 for filling the engine with lubricating oil. At the rightward end of the cover 38 in FIG. 1, the end of camshaft 31 is attached to a V-belt pulley 42, like the V- belt pulley 34 connected to the leftward end of the crankshaft 16. Pulley 42 engages a V-belt (not shown) for the purpose of driving an engine component such as an air pump for the emissions system. The cylinder head assembly 26 also supports threadably connected spark plugs 43, one of which is utilized for each combustion chamber 11 to ignite the mixture of fuel and air therein prior to a power or combustion stroke of piston 11 as is well known in the engine art.

As previously indicated, the engine 10 shown in FIGS. 1, 2 and 4 has a balancing mechanism 48 beneath the crankshaft and within the oil pan. The balancer 48 includes rotative shaft members which are driven by the crankshaft through a chain-type drive 44. Specifically, a toothed chain sprocket 45 is attached to the leftward end of the crankshaft 16 as best shown in FIG. 5 and is secured to the crankshaft by means of flat-head type cap screws 46, one of which is shown in FIG. 5. Resultantly, the sprocket 45 rotates with crankshaft 16 as does toothed belt sprocket 30 and the V-belt pulley 34 shown in FIG. 1. The V-belt pulley 34 and an associated V-belt are adapted to drive external engine components, such as the alternator, an air conditioning compressor and power steering pump. Also, the pulley 34 and associated belt operate a shaft attached to a pulley 47 in FIG. 4 which is connected and drives the engine distributor and the water pump. Unlike the V-belt belt pulley 34, the toothed belt sprocket 30 and the toothed chain sprocket 45 are protected from the engine compartment environment by means of a front cover assembly 49 on the front of the engine and is attached to the cylinder block by fasteners 51, perhaps as best shown in FIG. 1 and FIG. 4. The cover assembly 49 includes an upper portion 49' for protecting the upper portion of belt 41 and camshaft toothed sprocket 39. A lower portion 49" of assembly 49 protects the lower portion of belt 41. In the vicinity about the crankshaft wheel 30, the cover 49" is intended toward the right in FIG. 1 to facilitate attachment of the pulley 34 to the end of the crankshaft 16. The lower portion 49" of the cover assembly 49 contacts the front edge portion 21' of the oil pan 21 as shown in FIG. 1 and FIG. 5. A gasket or seal member 50 prevents leakage of oil from the interior of oil pan 21. Likewise, a seal 52 between member 49" and crankshaft 16 is utilized.

The balancing device or mechanism 48 is shown in FIG. 1 and FIG. 5 and has counter rotating shafts 54, 55 mounted in a housing 56 as best shown in FIG. 1 and FIG. 3. Housing 56 is a lightweight casting of aluminum material including a body portion 58 and a plurality of upwardly extending and parallel mounting legs or columns 60. Legs 60 have aligned bores 62 through which elongated bolts 61 are inserted for threadable attachment to the bearing web portions 25 as shown in FIG. 2. Parallel to bores 62 in the near and far legs and on the left in FIG. 3, lubrication passages 64 are provided for the bearings between housing 56 and shafts 54,55. The passages 64 are fed oil from the crankshaft bearing lubrication passages in web portions 25.

As best seen in FIG. 1, the plurality of support legs 60 for body 58 of the balancer provides clearance spaces therebetween in the longitudinal direction of the engine (parallel to the crankshaft). These spaces enable the lower ends of the connecting rods and associated journals 15 to move with the crankshaft while permitting the balancer to be mounted directly to the block web portions 25 between cylinder locations.

The shafts 54,55 are supported in housing body 58 by bearing portions 63,64. These bearing portions encircle cylindrical journal portions 65,66 of the shafts and receive lubricating oil through passages 64 as previously explained. The body 58 of housing 56 is generally hollow defining interior 67. Within interior 67, eccentric portions 68 of shafts 54,55 are free to rotate at twice the crankshaft speed to counteract the unbalance forces caused by the movement of the pistons 11 in cylinders 13.

As best illustrated in FIG. 1, the balance shafts 54,55 have rightward ends with eccentric portions 68' which extend beyond housing body 58. The ends 68' are isolated from lubricating oil 23 in pan 21 by a hollow cup-shaped enclosure 69. Enclosure 69 is attached to housing 58 by a plurality of cap screws 69', one of which is shown.

Shafts 54,55 are rotated in housing body 58 at twice crankshaft speed. Previously, chain 44 and sprocket 45 on the crankshaft 16 were identified. A chain sprocket 69' similar to sprocket 45 is affixed to the end of balance shaft 54 in the manner best shown in FIG. 5. Sprocket 70 is rotatively fixed to shaft 54 by key 71 and the end bolt fastener 72. Consequently, rotation of crankshaft sprocket 45 transmits rotation to sprocket 70 and balance shaft 54 through roller chain 44. Sprocket 45 on crankshaft 16 has twice the teeth as does sprocket 70 and, thus, the balance shaft is driven at twice the crankshaft rotational speed.

It is necessary to rotate both balance shafts 54,55 at twice crankshaft speed to counterbalance the unbalance caused by up and down piston and connecting rod movement. The shafts 54, 55 must also rotate in opposite directions to cancel out any sideways or lateral effect. This is known in the engine balance art. To accomplish this motion, both shafts 54,55 have meshed gears 76 of equal size affixed to the ends as shown in FIG. 1 and FIG. 4. The gears 76 are recessed into and rotative within a cavity 74 formed in the end of housing body 58 as shown in FIG. 3. The cavity 74 encloses the gears 76 in cooperation with an end cover member 78 which is attached to housing body 58 by cap screws 80 seen in FIG. 1. As shown in FIG. 2 and FIG. 4, the crankshaft 16 and shaft 54 rotate clockwise and shaft 56 rotates counter-clockwise.

Besides producing opposite and synchronous rotation of the shafts 54,55, the rotating gears 76 within closed cavity 74 perform a pumping function to evacuate lubricating oil from the interior 67 of body 58 and also from the interior of enclosure 69. With reference to FIG. 2 and FIG. 4, taken from the "front" or accessory end of the engine, the crankshaft 16 rotates clockwise. This produces clockwise rotation of leftward balance shaft 54 and counter-clockwise rotation of rightward balance shaft 55. As can be seen in FIG. 3 and FIG. 4, the close association of the teeth of gears 76 on the ends of shafts 54, 55 and its gear cavity 79 will cause oil to flow from outlet portion 81 of housing body 58. The oil flows from gear cavity 79 by opposite rotation of gears 76 into an inlet portion 81' of discharge outlet passage 81 as seen in FIG. 4. As best shown in FIG. 1, the discharge opening of outlet 81 is located above the highest normal surface of oil in pan 21. In addition, side slots or outlets 90 are provided in the side of housing 58 as shown in FIG. 2 and FIG. 3 which allow discharge of oil from the housing interior by having the eccentric portion 68 of shaft 55 pass close to the housing interior wall 91. The rotational movement (counter-clockwise) of the eccentric portion 68 with its flat leading edge 92 causes oil to be thrown toward and out the discharge slots 90. These slots 90, like outlet 81, are located to be above the highest normal surface of oil in pan 21. Thus, the pumping action of gear 76 and the pumping action of the balance shaft eccentric portion 68 remove oil from the housing 58 which was introduced to lubricate bearings 63,64.

Oil is discharged from the interior housing 58 by gears 76 and balance shaft eccentric portions 68, as previously explained. To facilitate the flow of oil to the gear 76, a drain channel means 82 is formed below bearing portion 73. Also, a similar drain channel means 84 is formed below bearing portion 64 to flow oil from the interior of the enclosure 69. It has been discovered that the interior of enclosure 69 will not readily permit the flow of oil therefrom without providing a vacuum breaking bleed vent means 86 formed near the top of the enclosure 69. Without vent 86, oil collects within enclosure 69 and the resultant movement of eccentric portion 68' will churn oil in enclosure 69 and generate undesirable energy losses.

I claim:

1. For an internal combustion engine including an engine block with parallel cylinder bores therein, a piston and an associated connecting rod movable in each of the bores, and a crankshaft which rotates to reciprocate the piston and connecting rod in each cylinder thereby generating periodic unbalance forces with each half-rotation of the crankshaft, an improved balancing device for generating forces to oppose and effectively cancel the aforesaid unbalance forces of the reciprocating pistons and connecting rods, comprising:

the improved balancing device having an elongated housing enclosure positioned beneath the engine block and the crankshaft, the housing enclosure having an upper and a lower wall, side walls and end walls defining a hollow interior, the end walls having a pair of apertures; a pair of elongated balance shafts extending between the apertures in the end walls and through the interior of the housing enclosure for rotation therein; the balance shafts having radially offset weight portions in the housing enclosure interior and positioned more toward one end wall than the other end wall but still subtantially filling the interior of the housing enclosure; the housing enclosure having three axially spaced and upwardly projecting legs spaced along both sides and with upper ends adapted to engage a bottom of the engine block for mounting the housing enclosure in downwardly spaced relation to the engine and crankshaft and for strengthening the housing, two of the legs on each side lying in a common plane with and being positioned radially outwardly from the offset weight portions of the balance shafts; securing means for attaching the legs to the engine block including an elongated aperture axially extending through each leg and elongated fastener means extending through the apertures and in attached relation to the engine block; an oil passage means axially extending through at least one leg between the upper end thereof and the housing enclosure interior being spaced from and in substantial parallelism with the leg's elongated aperture therein for supplying oil lubrication to balance shaft bearings formed by the end wall apertures.

* * * * *